United States Patent
Yamakawa et al.

(10) Patent No.: US 6,238,104 B1
(45) Date of Patent: May 29, 2001

(54) FIBER OPTIC CONNECTOR, SUPPORTING MEMBER USED THEREIN, AND METHOD OF CONNECTING THE FIBER OPTIC CONNECTOR TO A FIBER OPTIC CABLE

(75) Inventors: Jun Yamakawa, Chiba; Masato Shiino, Ichihara; Takehiro Hayashi, Kawasaki; Tomohiro Kikuta, Iwatsuki; Kenji Takahashi, Atsugi, all of (JP)

(73) Assignee: Tyco Electronics Corp, Wilmington, DE (US)

( * ) Notice: Subject to any disclaimer, the term of this patent is extended or adjusted under 35 U.S.C. 154(b) by 0 days.

(21) Appl. No.: 09/247,273

(22) Filed: Feb. 10, 1999

(30) Foreign Application Priority Data

Feb. 10, 1998 (JP) .................................................. 10-044449

(51) Int. Cl.[7] ...................................................... G02B 6/36
(52) U.S. Cl. .................................. 385/87; 385/81; 385/86
(58) Field of Search .................................. 385/53–55, 60, 385/62, 69, 70, 72, 76–78, 81, 92, 86–88

(56) References Cited

U.S. PATENT DOCUMENTS

| | | | | |
|---|---|---|---|---|
| 4,319,802 | * | 3/1982 | Bowes ..................................... | 385/87 |
| 4,730,890 | * | 3/1988 | Kashimura et al. .................... | 385/87 |
| 4,795,229 | * | 1/1989 | Abendschein et al. ................. | 385/87 |
| 4,802,728 | * | 2/1989 | Komatsu ................................. | 385/86 |
| 5,142,601 | * | 8/1992 | Shibata et al. ......................... | 385/86 |
| 5,287,425 | * | 2/1994 | Chang ..................................... | 385/81 |
| 5,363,459 | * | 11/1994 | Hultermans ............................. | 385/86 |
| 5,418,874 | * | 5/1995 | Carlisle et al. ......................... | 385/81 |

\* cited by examiner

Primary Examiner—Thong Nguyen

(57) ABSTRACT

The present invention provides a fiber optic connector which allows easy and secure assembly with a fiber optic cable, a supporting member used therein, and a method of assembling the fiber optic connector to the fiber optic cable. A member (41) which is used to fasten reinforcing members (105) extending from the fiber optic cable (100) is disposed in the vicinity of a rear end of an inner housing (40) of fiber optic connector (10). A supporting member (50) is fastened by crimping to an end portion of the fiber optic cable (100). An appropriate stripping operation is performed on the end portion of the fiber optic cable (100) so that optical fiber (150) and the reinforcing members (105) are exposed. Recesses (55a, 55b), which hold the reinforcing members are located in the supporting member (50). When optical fiber (150) of the fiber optic cable (100) is accommodated in a ferrule (30), the supporting member (50) is caused to engage a rear end of the inner housing (40); the reinforcing members (105) are disposed along member (41) of housing (40) whereafter they are fastened to member (41) by crimping sleeve (90) onto member (41).

14 Claims, 9 Drawing Sheets

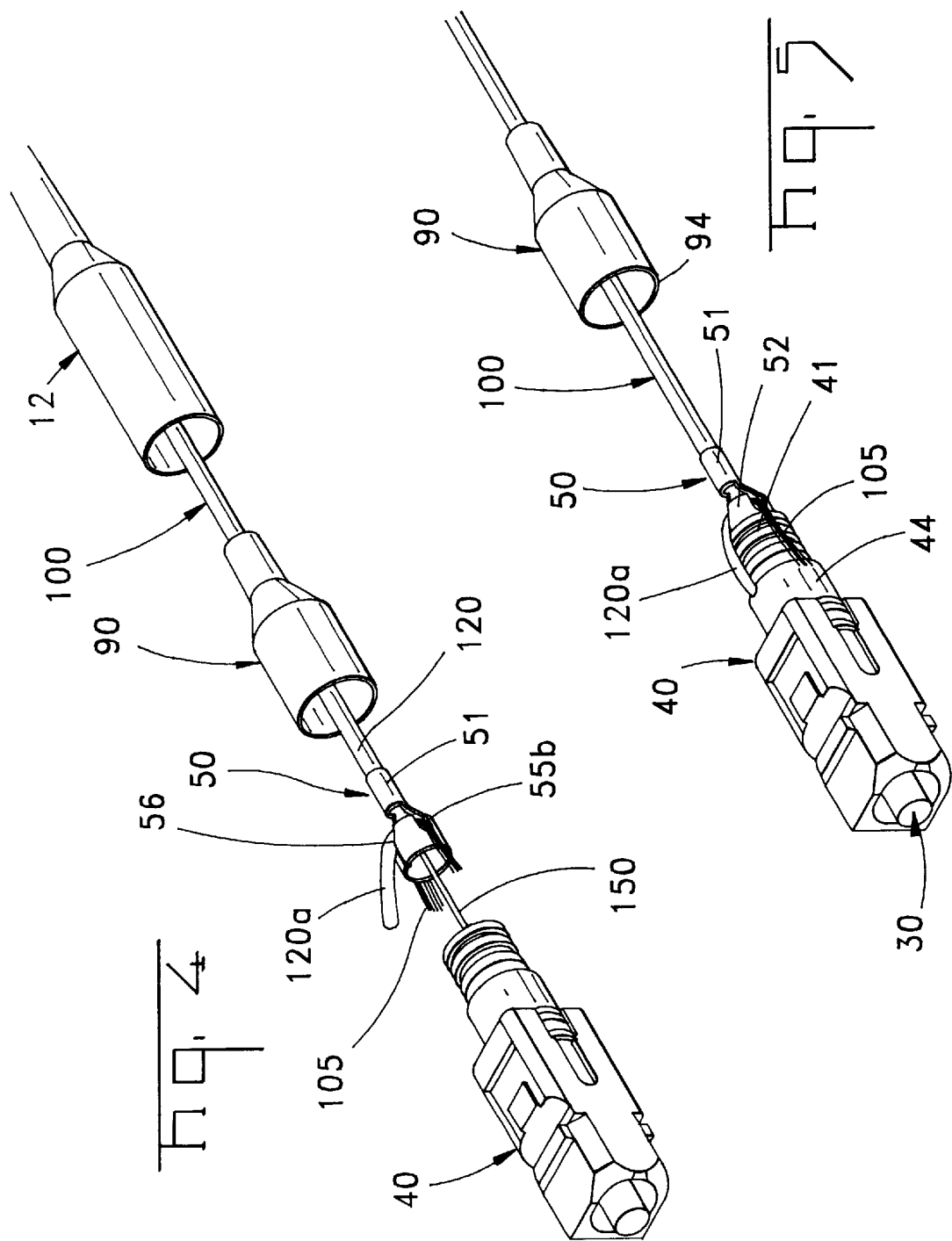

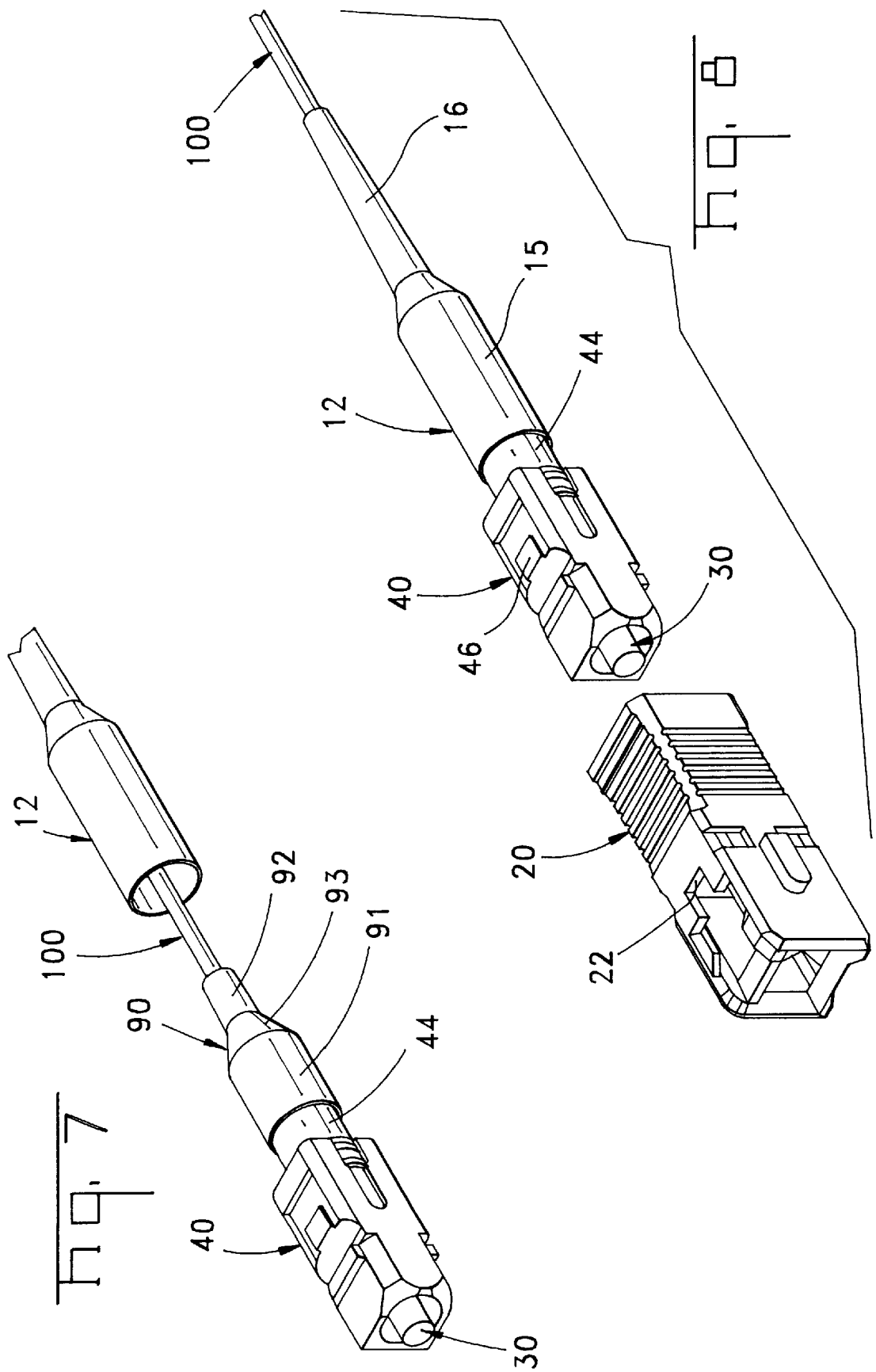

FIBER OPTIC CONNECTOR, SUPPORTING MEMBER USED THEREIN, AND METHOD OF CONNECTING THE FIBER OPTIC CONNECTOR TO A FIBER OPTIC CABLE

FIELD OF THE INVENTION

The present invention relates to a fiber optic connector for termination to a fiber optic cable, a supporting member used in the fiber optic connector, and a method of assembling the fiber optic connector with the fiber optic cable, and specifically the invention provides an assembly method that is suitable for reinforcing members and outer covering of the fiber optic cable being arranged on the supporting member which position the reinforcing members and outer covering onto a housing of the connector.

BACKGROUND OF THE INVENTION

A fiber optic cable termination structure in which Kevlar is used as reinforcing members is disclosed in Japanese Patent Application No. 7-84149 wherein a fiber optic connector has a Kevlar-fastening means to which the Kevlar reinforcing members are fastened by crimping in the vicinity of a rear end of a ferrule. A sleeve is mounted beforehand on an end of the fiber optic cable. The sleeve is inserted inside an outer covering, and the reinforcing members are clamped between the sleeve and the outer covering by the ferrule, while the optical fiber extends outwardly therefrom.

However, in the conventional fiber optic connector described above, there is a danger that the sleeve will fall off in the process in which the fiber optic cable and fiber optic connector are assembled; furthermore, the direction of extension of the Kevlar-reinforcing members is not determined when the sleeve is mounted on the end of the fiber optic cable. Consequently, assembly work is rendered more difficult.

SUMMARY OF THE INVENTION

Accordingly, the object of the present invention is to provide a fiber optic connector which allows easy and secure assembly with a fiber optic cable, a supporting member used therein, and a method of connecting the fiber optic connector to the fiber optic cable.

The present invention is directed to a fiber optic connector which includes a ferrule to which an optical fiber of a fiber optic cable is fastened, a member of a housing to which reinforcing members of the fiber optic cable are fastened, a supporting member which is equipped with a holding section that holds the reinforcing members and a crimping section that is crimped to an end portion of the fiber optic cable, and the holding section of the supporting member is disposed so that it guides the reinforcing members toward the fastening member of the housing.

A fiber optic connector for connection to a fiber optic cable comprises a housing having a ferrule provided with a bore in which an optical fiber of the fiber optic cable is secured and a fastening member; and a supporting member having a securing section for engagement with an end portion of the fiber optic cable and a holding section for holding reinforcing members of the fiber optic cable for disposition along the fastening member prior to being fastened thereto.

A method of connecting a fiber optic connector to a fiber optic cable comprises the steps of stripping the fiber optic cable exposing an optical fiber and reinforcing members; securing one end of a supporting member onto an outer covering of the fiber optic cable; positioning the reinforcing members in recesses of the supporting member; moving the supporting member adjacent a fastening member of a housing with the optical fiber being disposed in a bore of a ferrule within the housing; and the reinforcing members being arranged along the fastening members; and securing the optical fiber within the bore of the ferrule.

BRIEF DESCRIPTION OF THE DRAWINGS

Embodiments of the present invention will now be described by way of example with reference to the accompanying drawings in which:

FIGS. 3A and 3B are exploded perspective views of the respective constituent parts used in the assembly of the fiber optic cable and fiber optic connector. FIGS. 3A and 3B are views from different directions.

FIG. 4 is a perspective view illustrating a state in which the first step of the process of assembly of the fiber optic cable and fiber optic connector has been completed.

FIG. 5 is a perspective view illustrating a state in which the second step of the process of assembly has been completed.

FIG. 8 is a perspective view illustrating a state at an intermediate point in the fourth step of the process of assembly.

FIG. 9A is a perspective view showing the state of the sleeve prior to crimping, while FIG. 9B is a perspective view showing the state following crimping.

DETAILED DESCRIPTION OF THE INVENTION

Figure 1:
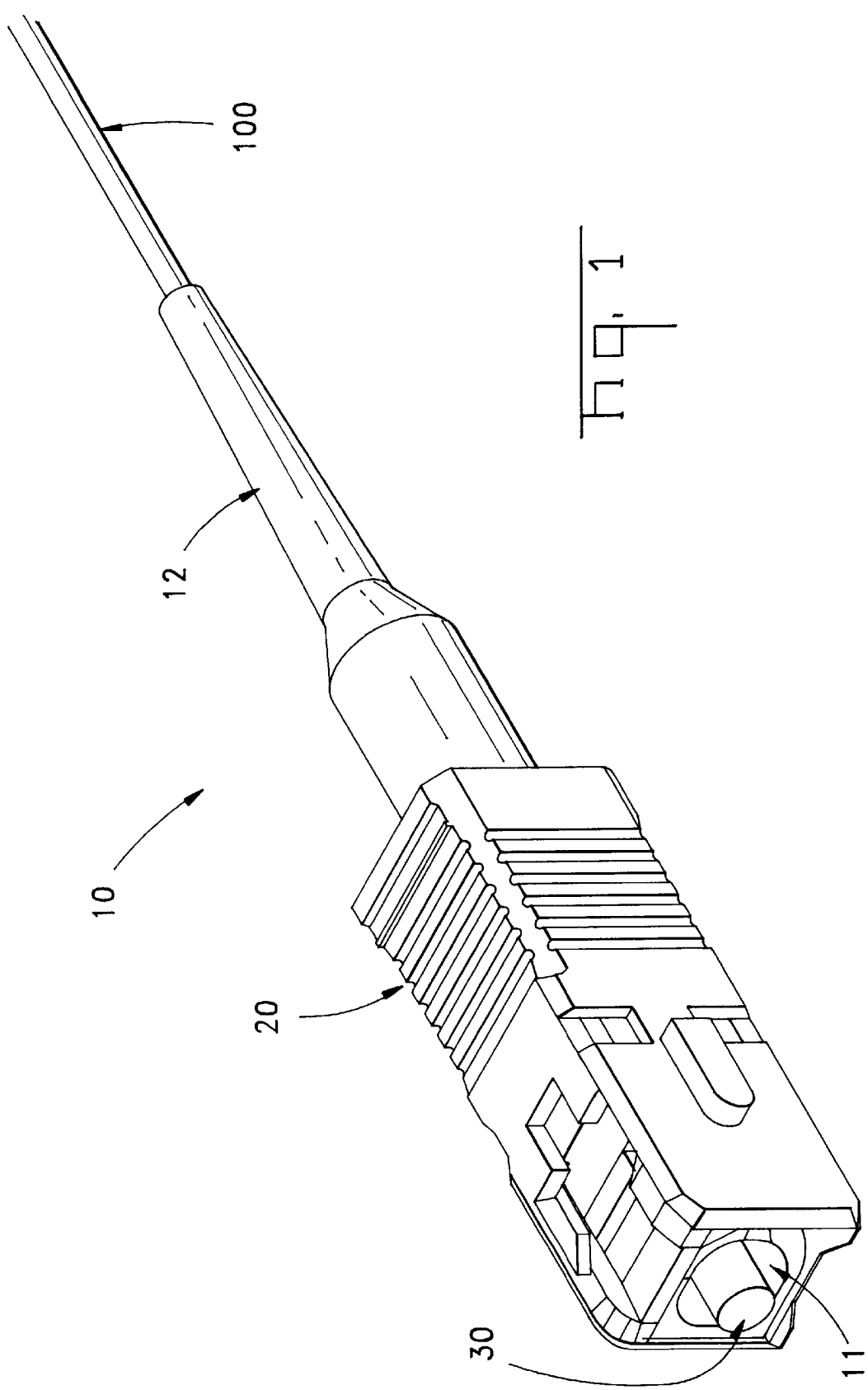
FIG. 1 is a perspective view of a fiber optic connector after assembly with a fiber optic cable has been completed.
Figure 2:
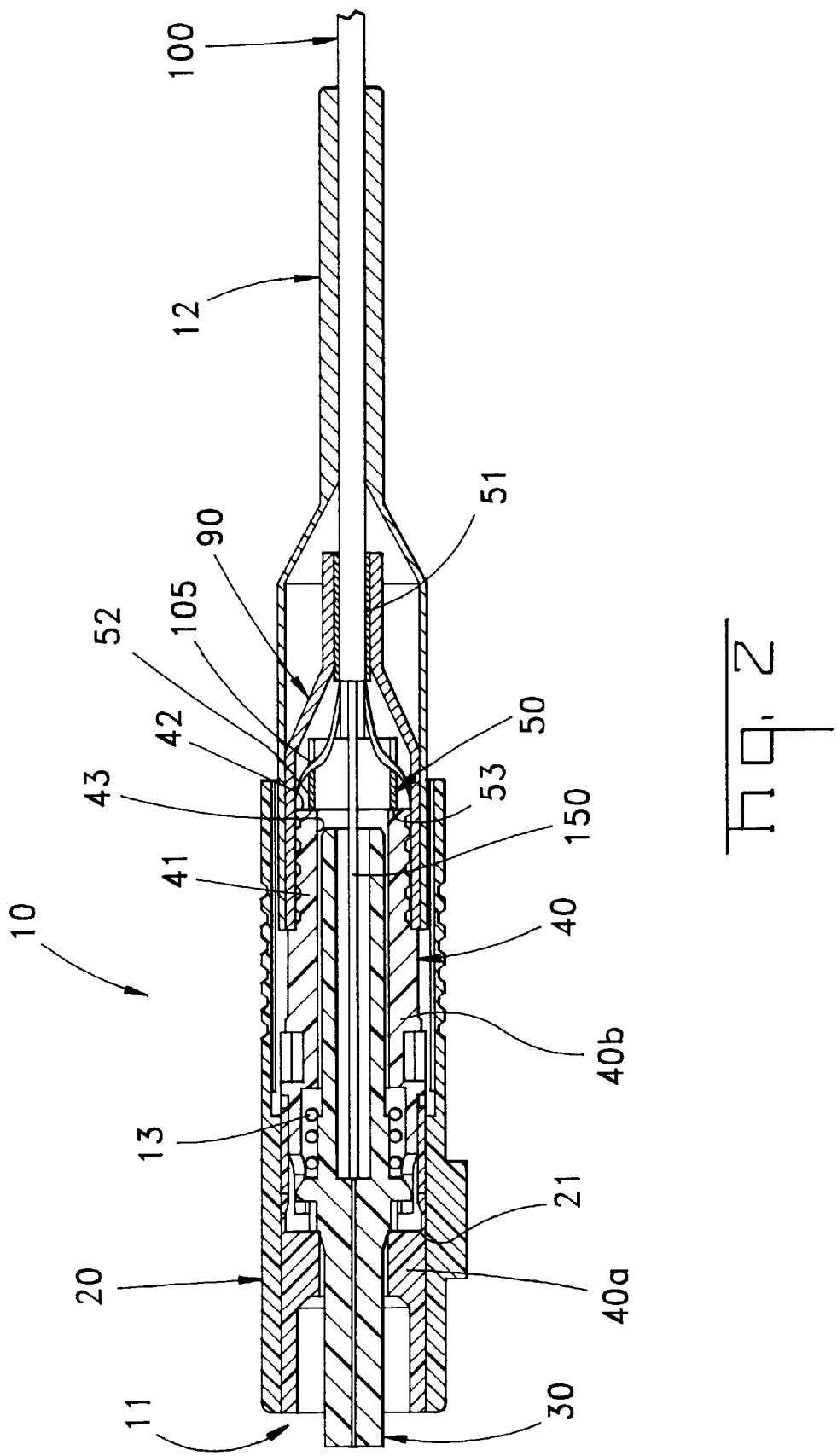
FIG. 2 is a cross-sectional view of the fiber optic connector shown in FIG. 1.

Fiber optic connector 10 shown in FIGS. 1 and 2 terminates a fiber optic cable 100, and it is classified as a known SC-type fiber optic connector. As shown in FIG. 1, mating section 11 of fiber optic connector 10 has a ferrule 30, which is disposed inside an outer housing 20. The fiber optic cable 100 extends from the fiber optic connector 10 and is supported by a strain-relief member 12 in the form of an elastic resin member. As shown in FIG. 2, the fiber optic connector 10 has an inner housing 40 inside the outer housing 20, and it is seen that the ferrule 30 is disposed inside the inner housing 40 so that the ferrule 30 can slide relative thereto. A spring member 13 acts to drive the ferrule 30 toward the mating section 11 and is disposed inside the inner housing 40. The inner housing 40 includes two sections, i.e., a front section 40a and a rear section 40b, and it is constructed so that the ferrule 30 and spring member 13 are held between these two sections as a result of both sections being mated with each other.

At an outer end, the inner housing 40 has a fastening member 41 on which reinforcing members 105 of Kevlar material, which extend from the fiber optic cable 100, are secured. As shown in FIG. 2, a sleeve 90 secures the reinforcing members 105 on the fastening member 41. A supporting member 50 is disposed inside of the sleeve 90. Supporting member 50 has a crimping section 51 which is crimped onto an end portion of the fiber optic cable 100, and it is disposed so as to engage a rear end 42 of the inner housing 40. Details of the configuration of the supporting member 50 will be described later. The sleeve 90 is disposed so that it engage the crimping section 51. Furthermore, the strain-relief member 12 is disposed so that it substantially covers the sleeve 90.

The method of assembly of the fiber optic connector 10 and fiber optic cable 100 will be described in order below. The shapes of the various constituent members will be indicated in detail in this description.

Figure 3A:
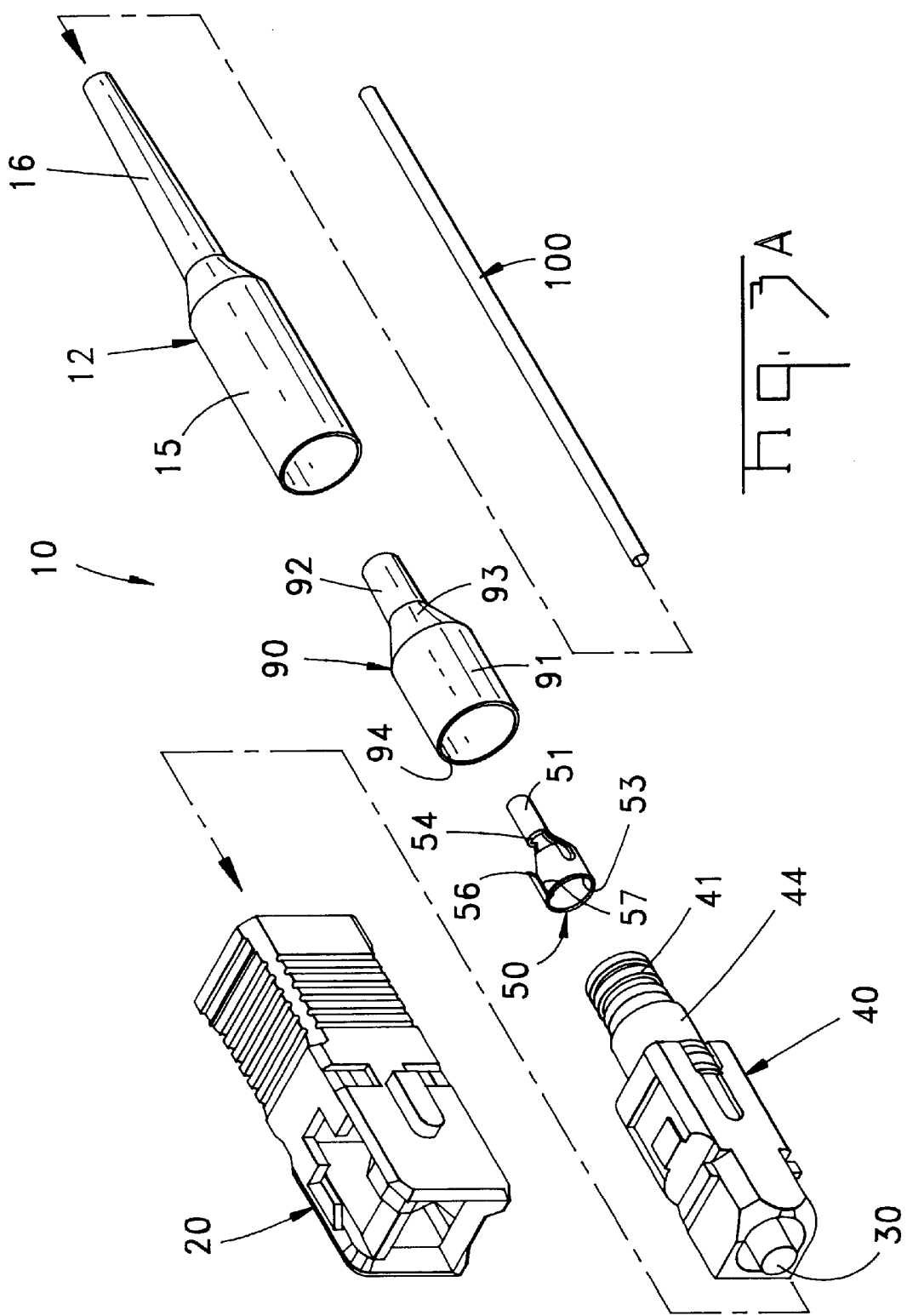

As shown in FIGS. 3A and 3B, the inner housing 40 is substantially box-shaped; however, the fastening member 41 and portion constituting a base member 44 are substantially cylindrical. As shown in FIG. 3B, a bore 43 extends through housing 40, and a portion of the ferrule 30 is accommodated inside bore 43. The inner housing 40 is disposed and held inside cavity 21 of the outer housing 20.

The supporting member 50 is formed by stamping and forming a metal plate, and crimping section 51 is a substantially cylindrical member, whereas cylindrical section 52 is expanded so that it has a larger diameter than the crimping section 51. As seen from FIG. 2, the diameter of the cylindrical section 52 is larger than the diameter of the bore 43, and a front end is used as an engaging end 53, which engages the inner housing 40. The cylindrical section 52 has recesses 55a, 55b and 56 that extend forward from a rear end 54 of the cylindrical section 52. The recess 56 is positioned in an upper portion of the cylindrical section 52, and the recesses 55a, 55b are symmetrically positioned on both sides of the cylindrical section 52. A seam 57 is located in the position of the recess 56. The crimping section 51 and cylindrical section 52 are positioned so that they are substantially concentric.

The sleeve 90 has a large-diameter portion 91, a small-diameter portion 92, and an intermediate portion 93 which is in the form of a frustum of a cone so that the large-diameter portion 91 and small-diameter portion 92 are connected thereby. As seen from FIG. 2, the large-diameter portion 91 is used for crimping of the reinforcing members 105 onto fastening member 41.

The strain-relief member 12 also has large-diameter section 15 and a small-diameter section 16. As shown in FIG. 2, the large-diameter section 15 is a section that is disposed so that it covers the sleeve 90. Furthermore, the small-diameter section 16 supports the fiber optic cable 100, and it has a hole 17 through which the fiber optic cable 100 extends. Furthermore, it should be noted that in the preparatory stage shown in FIGS. 3A and 3B, the fiber optic cable has not yet been subjected to a stripping operation.

FIG. 4 shows a state in which the first step of the process of assembly of the fiber optic cable and fiber optic connector has been completed. Furthermore, in FIGS. 4 through 7, parts not directly related to the process in question have been omitted.

In the first step of assembly, the fiber optic cable 100 is passed through the strain-relief member 12, sleeve 90, and crimping section 51 of the supporting member 50, after which an appropriate stripping operation is performed on the end portion of the fiber optic cable 100. As a result, optical fiber 150 inside the fiber optic cable 100, and the reinforcing members 105 are exposed. Furthermore, a slit is formed in the direction of length in the end of outer covering 120, and a portion 120a thereof is displaced from the optical fiber 150 for a relatively short distance. Next, the crimping section 51 of the supporting member 50 is fastened to the end portion of the fiber optic cable 100 by being crimped thereon. Furthermore, the exposed reinforcing members 105 are bundled and extended in two directions on both sides, and they are accommodated in the recesses 55a, 55b of cylindrical section 52 as shown in FIG. 4. Since the reinforcing members 105 of Kevlar material do not possess elasticity, reinforcing members 105 will not leave the recesses 55a, 55b once they have been oriented by the recesses 55a, 55b. In this case, the displaced portion 120a of the outer covering 120 is accommodated in the recess 56 as shown in FIG. 4. Although the outer covering 120 has a slight elastic stress, the action of such stress is oriented in the direction of accommodation in the recess 56; accordingly, the displaced portion 120a does not leave the recess 56. Thus, the supporting member 50 is crimped to the end of the fiber optic cable 100, and the reinforcing members 105 and displaced portion 120a of the outer covering 120 are held by the cylindrical section 52 of the supporting member 50, so that subsequent work can be performed easily and securely. Thus, cylindrical section 52 is a holding section for the reinforcing members 105 and displaced portion 120a.

Figure 6:
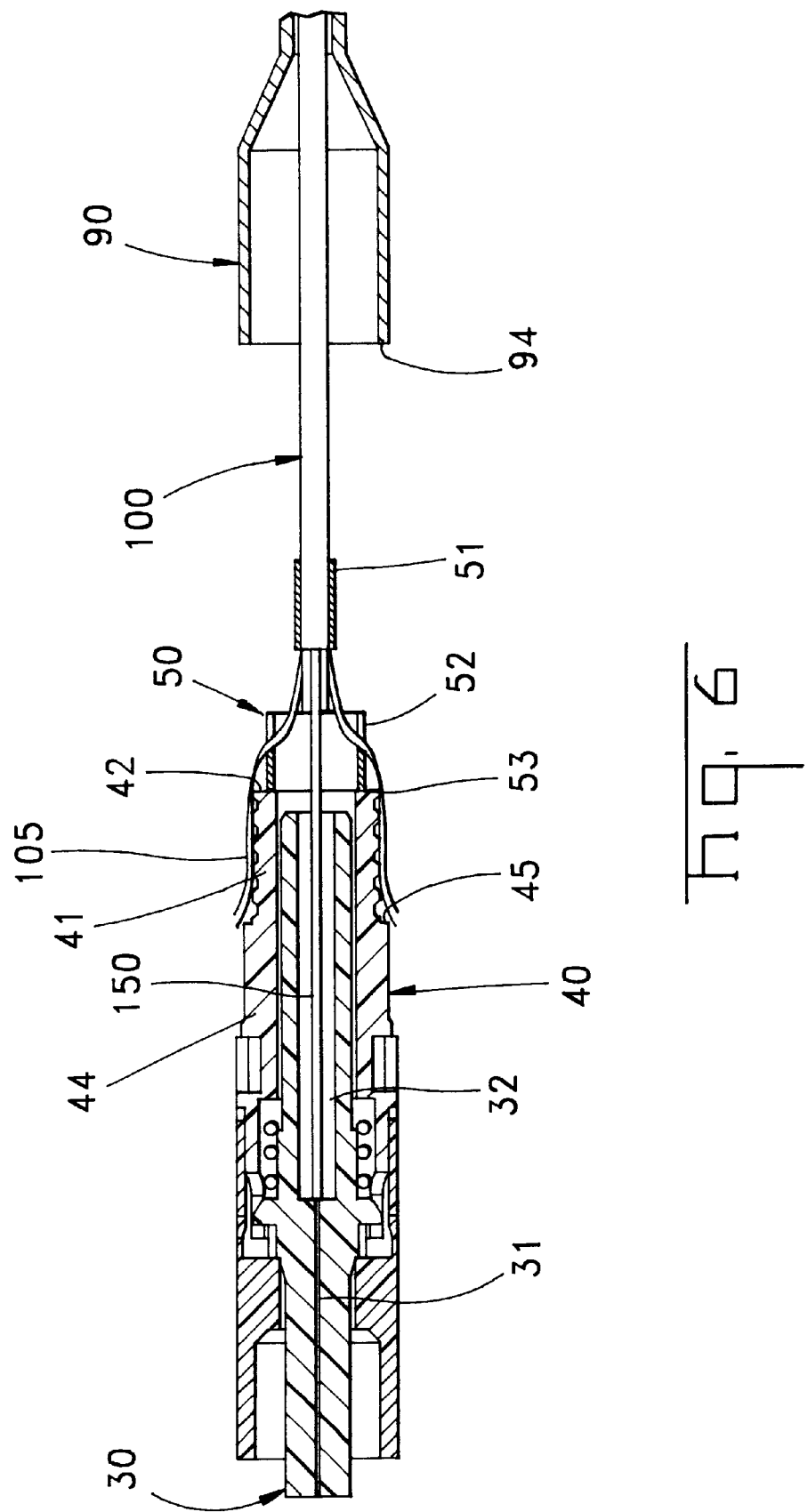
FIG. 6 is a cross-sectional view of the state shown in FIG. 5.

FIGS. 5 and 6 illustrate a state in which the second step in the process of assembly has been completed.

In the second step, the exposed optical fiber 150 is accommodated inside the guide hole 31 of the ferrule 30, and the supporting member 50 engages with the rear end 42 of the inner housing 40. In this case, the engaging end 53 (see FIG. 3A) of the cylindrical section 52 engages the rear end 42 of the inner housing 40. As a result, the reinforcing members 105 are guided onto the fastening member 41 of the inner housing 40. Furthermore, as shown in FIG. 5, the displaced portion 120a of the outer covering 120 is also placed on the fastening member 41. Thus, the cylindrical section 52 holds and guides the reinforcing members 105 and portion 120a of the outer covering 120. Next, the optical fiber 150 is fastened by means of an adhesive (not shown) inside the bore 32 of the ferrule 30. This is accomplished by the injection of the adhesive into the bore 32; as a result, the optical fiber 150 is firmly fastened to the ferrule 30.

Figure 7B:
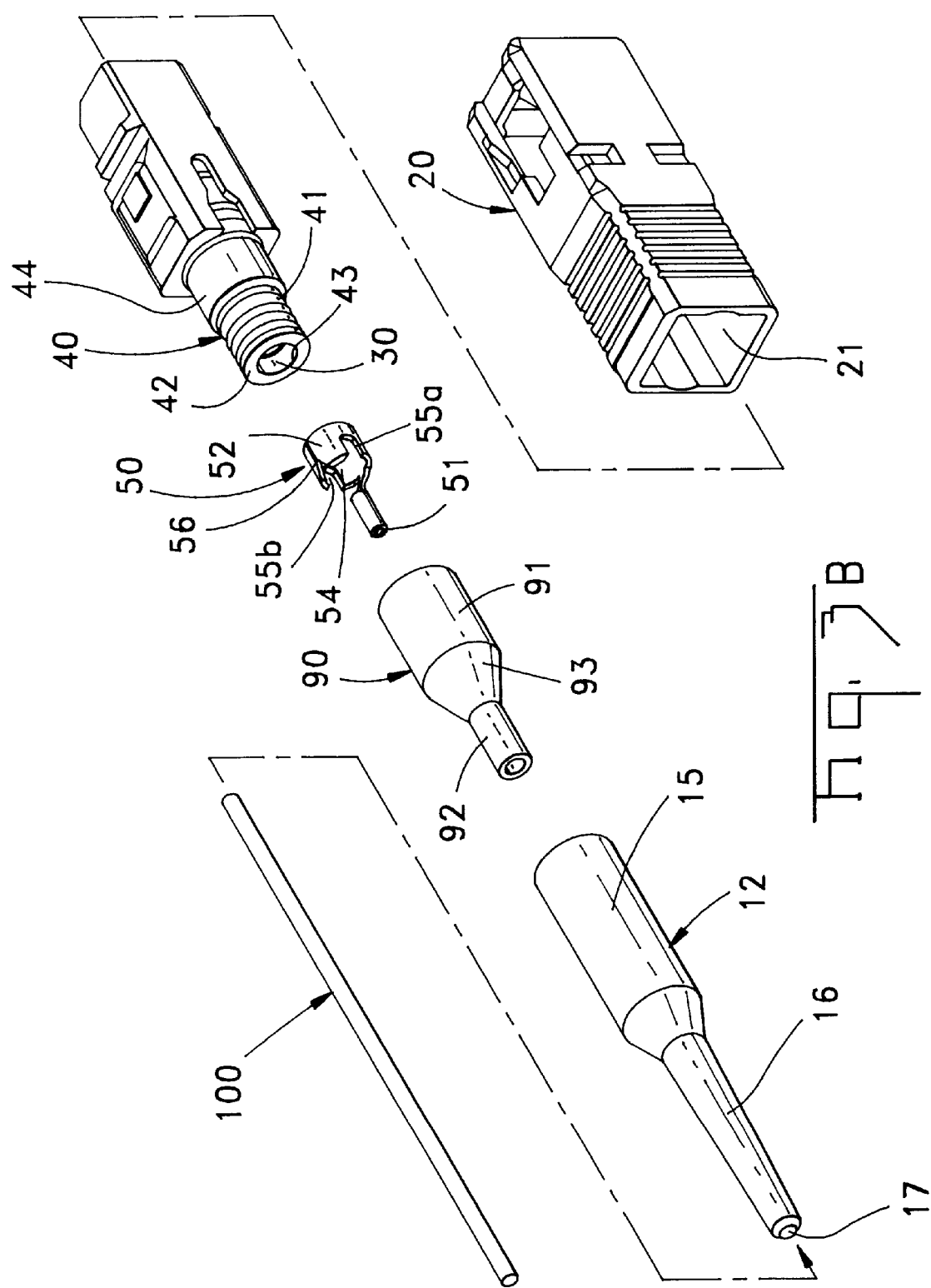
FIG. 7 is a perspective view illustrating a state in which the third step of the process of assembly has been completed.

FIG. 7 illustrates a state in which the third step of the process of assembly has been completed.

In the third step of the process, the crimping of the sleeve 90 is performed. The sleeve 90 is moved toward the inner housing 40 from the position shown in FIG. 6, and the large-diameter portion 91 of the sleeve 90 is disposed so that it is superimposed on the displaced portion 120a of the outer covering 120 and the reinforcing members 105 placed on the fastening member 41. As shown in FIG. 6, a shoulder 45 is located between the fastening member 41 and base member 44 of the inner housing 40. The sleeve 90 is moved to a position where its front end 94 (see FIG. 5 or FIG. 6) engages the shoulder 45, and this movement is regulated by the engagement therebetween. Afterward, crimping is performed on the large-diameter portion 91 of the sleeve 90; as a result, the reinforcing members 105 and the displaced portion 120a of the outer covering 120 are secured to fastening member 41 of the inner housing 40. In this case, as was described above, the small-diameter portion 92 is placed in a position on the crimping section 51 of the supporting member 50; the small-diameter portion 92 acts to regulate the position of the crimping section part 51. Furthermore, the intermediate portion 93 of the sleeve 90 also approaches the rear end 54 of the cylindrical section 52, and it can regulate the movement of the cylindrical section 52 rearward or in the direction which deviates from an axis thereof. Furthermore, in the crimping of the large-diameter portion 91 of the sleeve 90, it would also be possible for only the reinforcing members 105 to be crimped, with the outer covering 120 not being crimped. Thus, crimping of the reinforcing members 105 alone can be undertaken.

FIG. 8 illustrates a state at an intermediate point in the fourth step of the process.

In the final step, which is the fourth step in the process, the attachment of the strain-relief member 12 and the engagement of the inner housing 40 and outer housing 20 are performed. FIG. 8 shows a state in which the strain-relief member 12 is mounted. As shown, the large-diameter section 15 of the strain-relief member 12 is disposed so that it substantially covers the large-diameter portion 91 of the sleeve 90. The small-diameter section 16 extends in the direction of length of the fiber optic cable 100, and it acts to alleviate stress thereon. Afterward, the inner housing 40 is accommodated inside the cavity 21 of the outer housing 20. A projection 46 is located on an outside surface of the inner housing 40; projection 46 engages with a shoulder 22 in the outer housing 20 so that the inner housing 40 is latched to housing 20.

The assembled fiber optic cable and fiber optic connector shown in FIGS. 1 and 2 is completed by means of the first through fourth steps described above. The important feature in the present invention is that a supporting member 50 is used. As a result of the use of a supporting member 50, which is crimped to the fiber optic cable 100 and which supports the reinforcing members 105, the assembly of the fiber optic cable 100 and fiber optic connector 10 can easily be accomplished. The method described in relation to FIGS. 4–8 is not limited to manual assembly; the use of an automated assembly machine is also possible.

An alternative embodiment of the present invention will now be described with reference to FIGS. 9A, 9B and 10.

Figure 9A:
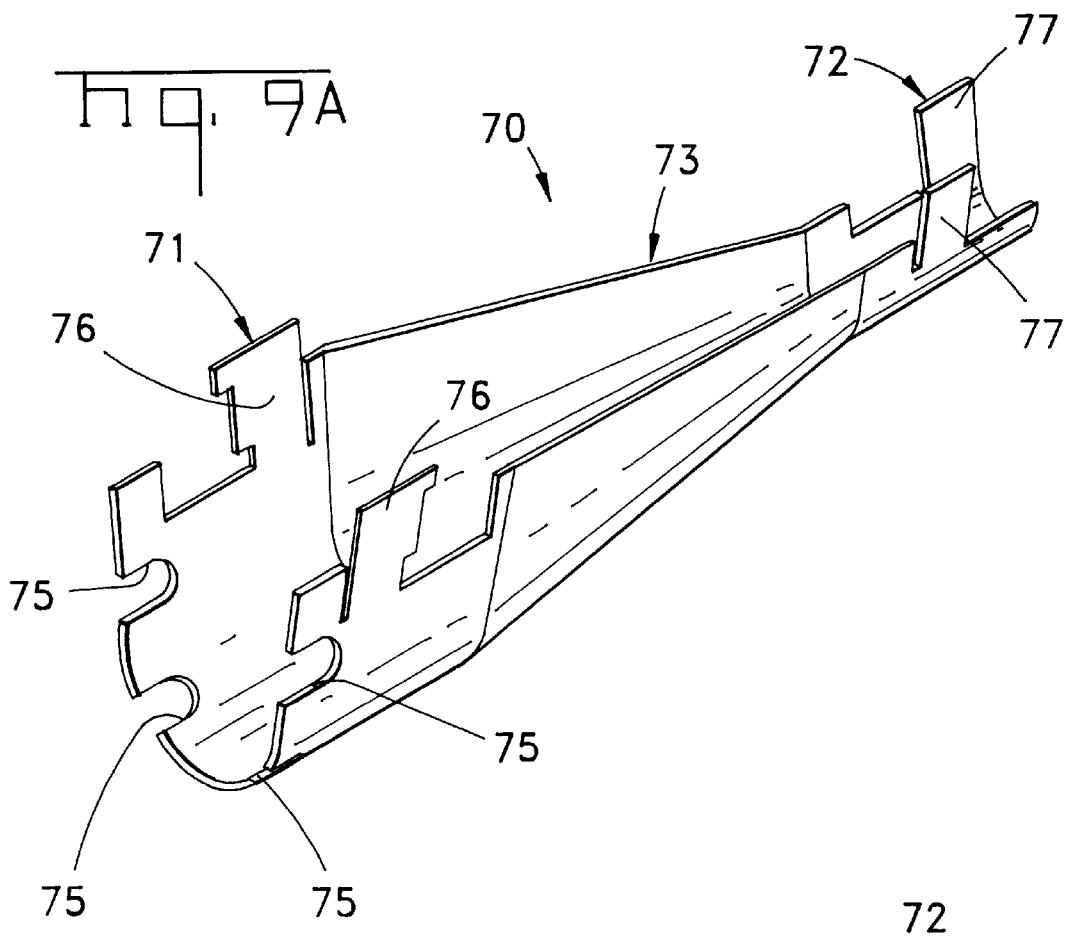
FIGS. 9A and 9B show a sleeve as an alternative embodiment.
Figure 9B:
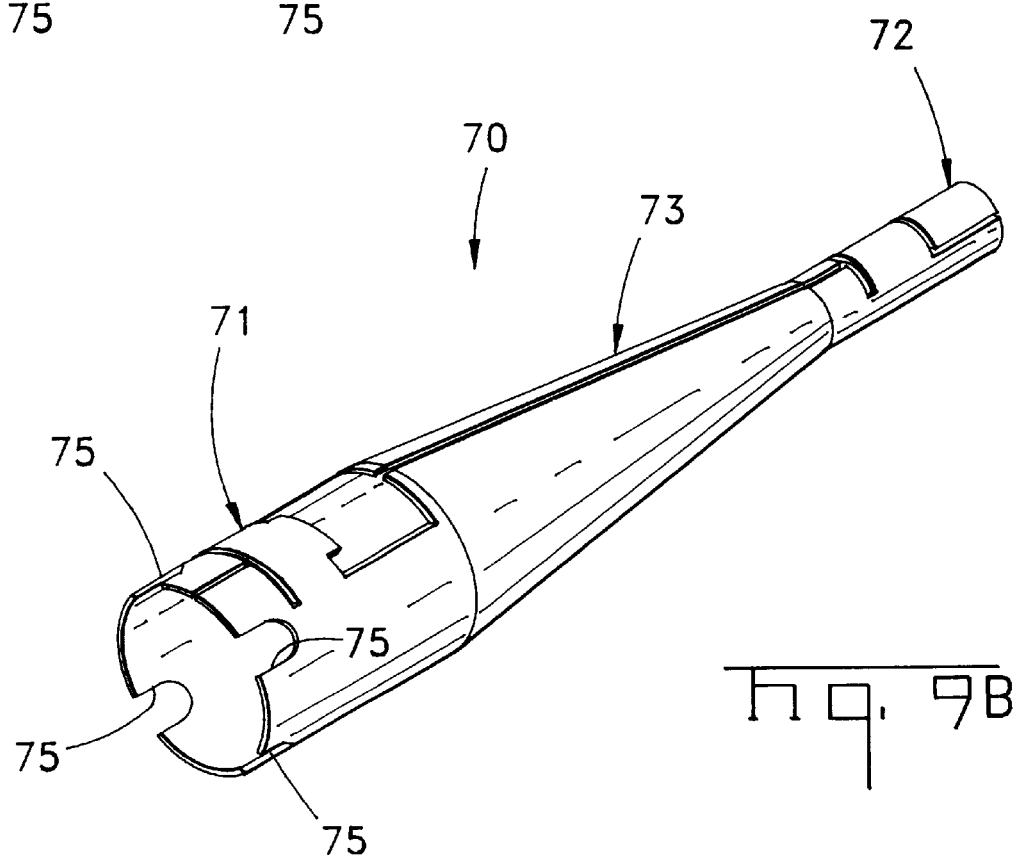
Figure 10:
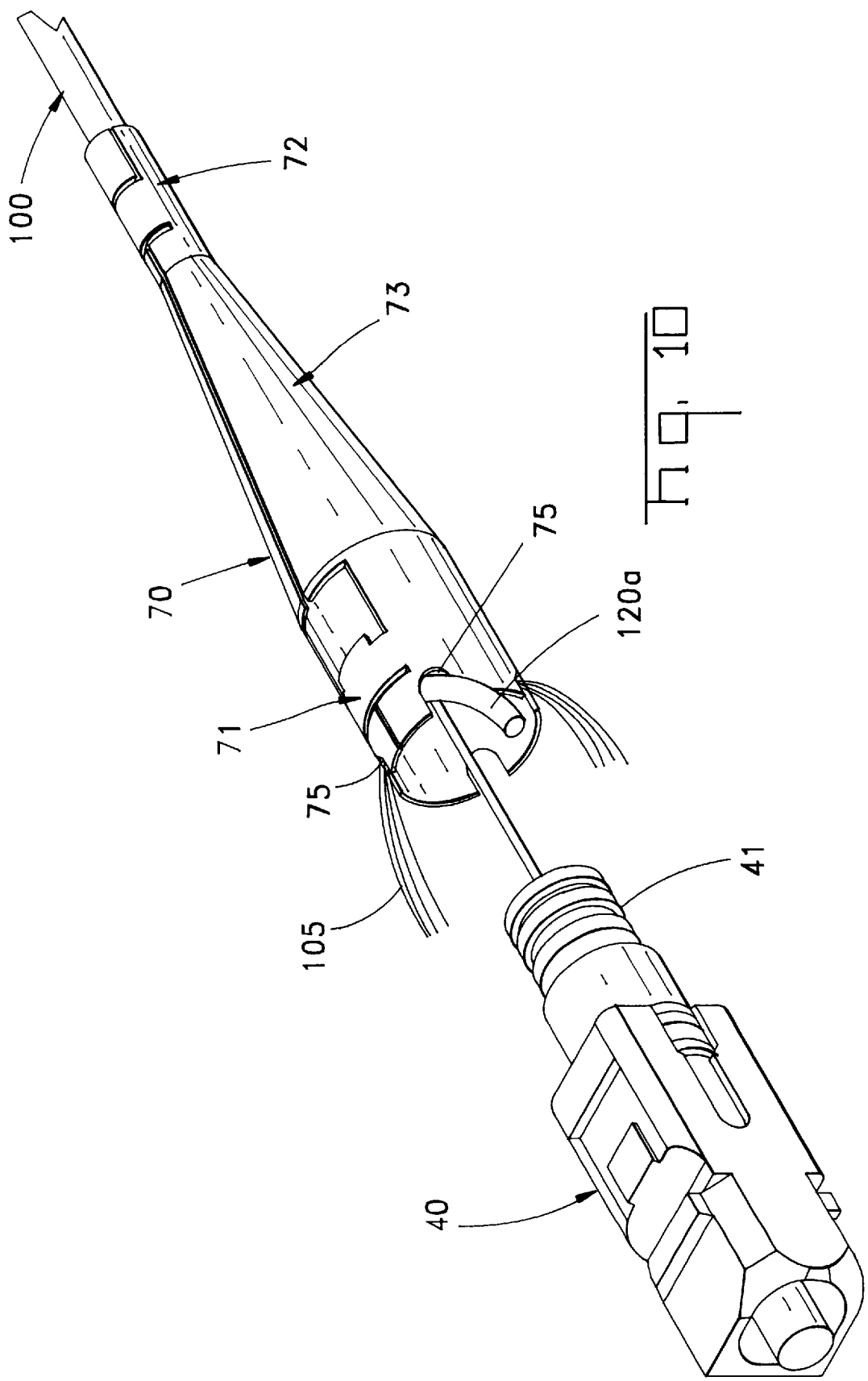
FIG. 10 is a perspective view illustrating a state in which the first step of the process of assembly has been completed using the sleeve of FIGS. 9A and 9B.

Sleeve 70 shown in FIGS. 9A, 9B is a member which has the functions of both the supporting member 50 and sleeve 90 described above. Sleeve 70 is formed by stamping and forming a metal plate, and it has a large-diameter cylindrical portion 71, a small-diameter cylindrical portion 72 and an intermediate portion 73, which connects the large-diameter portion 71 and small-diameter portion 72. As will be seen by reference to FIG. 10, the large-diameter portion 71 is used for securing the reinforcing members 105 of the fiber optic cable 100 by crimping; four recesses 75 which face forward are located in the front end of the large-diameter portion 71. As will be described later, the recesses 75 can be used as covering-holding recesses or reinforcing member-holding recesses. A pair of engaging members 76, which engage with each other at the time of crimping, are disposed at a rearward position of the large-diameter portion 71. Moreover, the small-diameter portion 72 is used for crimping to the fiber optic cable 100, and it has a pair of tabs 77 that are offset in the direction of length.

At the time of assembly, the small-diameter portion 72 is first crimped to the fiber optic cable 100 as the first step; as a result, the sleeve 70 is fastened to the fiber optic cable 100. Furthermore, in the first step, an appropriate stripping operation is performed on the end portion of the fiber optic cable 100, and the reinforcing members 105 and the displaced portion 120a of the outer covering 120 are accommodated and held in the recesses 75. In this case, it is advisable that the reinforcing members 105 be accommodated and held in two facing recesses 75, and that the displaced portion 120a of the outer covering 120 be accommodated and held in one of the remaining recesses 75. Then, in the second step of the process, the large-diameter portion 71 of the sleeve 70 is crimped to the fastening member 41 at the rear end of the inner housing 40. As a result of this operation, the reinforcing members 105 are secured by crimping in positions substantially opposite each other along the fastening member 41. The remaining steps in assembly are similar to that described in the first embodiment and need not be described. The advantage of the alternative embodiment is that the number of parts can be reduced, so that the assembly of the fiber optic connector and the connection thereof to a fiber optic cable can be realized by means of an extremely simple operation; furthermore, the fiber optic connector can be provided at a low cost.

A fiber optic connector of the present invention, a supporting member used therein, and a method of a fiber optic connector to a fiber optic cable were described above. However, these were merely examples and do not limit the present invention. Various modifications and alterations may be made by a person skilled in the art of the invention.

In the fiber optic connector of the present invention, a supporting member, which is equipped with a holding section that holds reinforcing members of a fiber optic cable and a crimping section that is crimped to an end portion of the fiber optic cable is provided, and the holding section is disposed so that it guides the reinforcing members toward a member onto which the reinforcing members are to be fastened. Accordingly, the handling of the reinforcing members in the assembly process is facilitated, and there is no danger that the reinforcing members will enter undesirable areas inside the fiber optic connector.

Furthermore, in the supporting member of the fiber optic connector used in the present invention, a crimping section, which can be crimped to an end portion of a fiber optic cable, and a holding section, which holds reinforcing members of the fiber optic cable are provided; accordingly, assembly of the fiber optic connector can be sufficiently facilitated using a relatively simple construction.

Furthermore, in the method of the present invention for assembling a fiber optic cable and fiber optic connector, the method includes the steps of a supporting member crimped to an end portion of the fiber optic cable, and a portion of an outer covering and reinforcing members of the fiber optic cable are respectively held by a holding section of the supporting member, the supporting member is caused to engage a housing of the fiber optic connector and the optical fiber of the fiber optic cable is adhesively fastened to a ferrule, the reinforcing members are superimposed on a member in the housing, the reinforcing members are fastened to the housing member. Accordingly, handling of the reinforcing members is facilitated, with no danger that the reinforcing members will not be properly secured to the housing during assembly. Consequently, the assembly of the fiber optic cable and fiber optic connector can be accomplished smoothly. In particular, the method of assembly of the present invention is suitable for assembly by means of an automatic machine.

What is claimed is:

1. A fiber optic connector for connection to a fiber optic cable, comprising a housing having a ferrule provided with a bore in which an optical fiber of the fiber optic cable is secured and a fastening member; and a supporting member having a securing section for engagement with an end portion of the fiber optic cable and a holding section for holding reinforcing members of the fiber optic cable for disposition along the fastening member prior to being fastened thereto, wherein the holding section comprises at least one passageway through the supporting member to allow the reinforcing members to pass laterally from inside the supporting member to outside the supporting member, and wherein the securing section is a crimping section to effect crimping engagement with the end portion of the fiber optic cable.

2. A fiber optic connector as claimed in claim 1, wherein the passageway comprises recesses.

3. A fiber optic connector as claimed in claim 2, wherein the supporting member comprises another recess for accommodating a portion of an outer covering of the fiber optic cable.

4. A fiber optic connector as claimed in claim 2, wherein the holding section engages an outer end of the fastening member.

5. A fiber optic connector as claimed in claim 1, wherein a sleeve is disposed over the supporting member and includes a small-diameter portion for crimping engagement with the crimping section and a large-diameter portion for crimping engagement onto the fastening member to fasten the reinforcing members thereon.

6. A fiber optic connector as claimed in claim 5, wherein a strain-relief member has a large-diameter section disposed along the large-diameter portion of the supporting member and a small-diameter section extending along the fiber optic cable.

7. A fiber optic connector as claimed in claim 1, wherein the supporting member is a sleeve having a small-diameter portion defining a crimping section for crimping engagement with the end portion of the fiber optic cable and a large-diameter portion including recesses in which the reinforcing members are disposed and which is crimped onto the fastening member.

8. A method of connecting a fiber optic connector to a fiber optic cable, comprising the steps of:

stripping the fiber optic cable exposing an optical fiber and reinforcing members;

securing one end of a supporting member onto an outer covering of the fiber optic cable;

inserting the reinforcing members in one end of the supporting member;

guiding the reinforcing members laterally out of the supporting member;

moving the supporting member adjacent a fastening member of a housing with the optical fiber being disposed in a bore of a ferrule within the housing such that the reinforcing members are arranged along the fastening member; and securing the optical fiber within the bore of the ferrule.

9. A method as claimed in claim 8, wherein the one end of the supporting member is secured onto the outer covering of the fiber optic cable by crimping.

10. A method as claimed in claim 9, wherein a sleeve covers the supporting member with one end of the sleeve being crimped onto the crimped end of the supporting member and the other end of the sleeve being crimped onto the fastening member with the reinforcing members therebetween.

11. A method as claimed in claim 10, wherein a portion of the outer covering is positioned in another recess of the supporting member so that the portion of the outer covering is located between the crimped other end and the fastening member.

12. A method as claimed in claim 10, wherein a strain-relief member covers the sleeve with an inner end engaging the other end of the sleeve and an outer end extending along a section of the fiber optic cable.

13. A method as claimed in claim 8, wherein the supporting member is a sleeve with the one end being crimped onto the outer covering of the fiber optic cable and the other end of the sleeve having the recesses in which the reinforcing members are positioned and crimping the other end of the sleeve onto the fastening member with the reinforcing members therebetween.

14. A method as claimed in claim 13, wherein a portion of the outer covering is positioned within another recess of the sleeve so that the portion of the outer covering is located between the crimped other end and the fastening member.

* * * * *